United States Patent
Feuillette

(10) Patent No.: US 10,719,657 B1
(45) Date of Patent: Jul. 21, 2020

(54) PROCESS DESIGN KIT (PDK) WITH DESIGN SCAN SCRIPT

(71) Applicant: GLOBALFOUNDRIES INC., Grand Cayman (KY)

(72) Inventor: Romain Herve Aurelien Feuillette, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/398,312

(22) Filed: Apr. 30, 2019

(51) Int. Cl.
*G06F 30/00* (2020.01)
*G06F 30/398* (2020.01)
*G06F 17/18* (2006.01)
*G06F 30/392* (2020.01)

(52) U.S. Cl.
CPC ............ *G06F 30/398* (2020.01); *G06F 17/18* (2013.01); *G06F 30/392* (2020.01)

(58) Field of Classification Search
CPC ....... G06F 30/398; G06F 30/392; G06F 17/18
See application file for complete search history.

(56) References Cited

U.S. PATENT DOCUMENTS

| | | | | |
|---|---|---|---|---|
| 6,477,683 B1 * | 11/2002 | Killian | ...................... | G06F 8/41 716/106 |
| 6,625,781 B2 * | 9/2003 | Roethig | .................. | G06F 30/33 716/109 |
| 6,823,497 B2 * | 11/2004 | Schubert | ................. | G06F 30/33 716/106 |
| 7,296,248 B2 * | 11/2007 | Perez | .................... | G06F 30/398 716/103 |
| 7,437,692 B2 * | 10/2008 | Oberlaender | .......... | G06F 30/33 716/138 |
| 7,478,303 B2 * | 1/2009 | Hopkins | ........... | H04L 12/40052 714/734 |
| 7,490,319 B2 * | 2/2009 | Blackwell | ........... | G06F 11/3664 717/124 |

(Continued)

OTHER PUBLICATIONS

Joshi et al., "An Approach for a Comprehensive QA Methodology for the PDKs," IEEE 9th International Symposium on Quality Electronic Design, 2008, pp. 480-483.

(Continued)

*Primary Examiner* — Naum Levin
(74) *Attorney, Agent, or Firm* — Gibb & Riley, LLC; David A. Cain, Esq.

(57) ABSTRACT

Disclosed are a process design kit (PDK) for integrated circuit (IC) designs and a computer-aided design (CAD) system that employs the PDK. The PDK includes a design scan script. When the script is executed by the CAD system, previously generated and stored IC designs are scanned and a report with cell use information (CUI) is generated. The CUI indicates the different parameterized cells (pcells) and different configurations thereof contained in the IC designs. Also disclosed is a PDK development system, which receives CUI reports from CAD system(s), compiles the CUI, and revises the PDK (i.e., develops an update or upgrade) based, in part, on the complied CUI. For example, the complied CUI can indicate critical targets that require a regression analysis during the PDK revision process. By limiting regression analyses to identified critical targets, the turn around time and costs associated with revising the PDK are significantly reduced.

20 Claims, 9 Drawing Sheets

(56) References Cited

U.S. PATENT DOCUMENTS

| | | | | |
|---|---|---|---|---|
| 7,865,853 | B2 * | 1/2011 | Hekmatpour | G06F 30/33 |
| | | | | 716/106 |
| 8,046,730 | B1 * | 10/2011 | Ferguson | G06F 30/39 |
| | | | | 716/139 |
| 8,234,617 | B2 * | 7/2012 | Chetput | G06F 30/33 |
| | | | | 716/136 |
| 8,271,232 | B1 | 9/2012 | Roucis et al. | |
| 8,312,410 | B2 * | 11/2012 | Foster | G06F 30/00 |
| | | | | 716/136 |
| 8,666,720 | B2 * | 3/2014 | Chang | G06F 30/33 |
| | | | | 703/13 |
| 8,707,226 | B2 * | 4/2014 | Lu | G06F 30/392 |
| | | | | 716/104 |
| 8,726,209 | B1 * | 5/2014 | Lamant | G06F 30/39 |
| | | | | 716/111 |
| 8,732,640 | B1 * | 5/2014 | Krishnan | G06F 30/398 |
| | | | | 716/110 |
| 8,875,064 | B2 | 10/2014 | Aggarwal et al. | |
| 9,122,834 | B1 * | 9/2015 | Caluya | G06F 30/398 |
| 9,330,219 | B2 | 5/2016 | Yang et al. | |
| 9,355,130 | B1 * | 5/2016 | O'Riordan | G06Q 50/00 |
| 9,411,710 | B2 | 8/2016 | Kumar et al. | |
| 10,331,842 | B2 * | 6/2019 | Alloatti | G06F 30/398 |
| 10,460,069 | B1 * | 10/2019 | Burdick | G06F 30/39 |
| 2005/0257178 | A1 * | 11/2005 | Daems | G06F 30/30 |
| | | | | 716/51 |
| 2011/0161294 | A1 * | 6/2011 | Vengerov | G06F 16/275 |
| | | | | 707/637 |
| 2016/0171149 | A1 * | 6/2016 | Alloatti | G06F 30/392 |
| | | | | 716/52 |
| 2017/0046470 | A1 | 2/2017 | Allamraju et al. | |
| 2017/0098028 | A1 * | 4/2017 | Donnelly | G06F 30/367 |

OTHER PUBLICATIONS

Gadepally et al., "Strategies for Quality CAD PDKs," IEEE 9th International Symposium on Quality Electronic Design, 2008, pp. 484-487.

Li et al., "A Complete Process Design Kit Verification Flow and Platform for 28nm Technology and Beyond," IEEE 11th International Conference on Solid-State and Integrated Circuit Technology, 2012, pp. 1-4.

Mohy et al., "A Robust and Automated Methodology for LVS Quality Assurance," IEEE 4th International Design and Test Workshop (IDT), 2009, pp. 1-3.

* cited by examiner

141

| Pcells | Configuration(s) For Each Pcell |
|---|---|
| Pcell No. 13 | Pcell No. 13 - Configuration No. 6 |
|  | Pcell No. 13 - Configuration No. 21 |
| Pcell No. 126 | Pcell No. 126 - Configuration No. 16 |
|  | Pcell No. 126 - Configuration No. 17 |
| Pcell No. 141 | Pcell No. 141 - Configuration No. 50 |
| ⋮ |  |
| Pcell No. $X$ | Pcell No. $X$ - Configuration No. $Y$ |

141

| Pcells | Configuration(s) For Each Pcell |
|---|---|
| Pcell No. 13 | Pcell No. 13 - Configuration No. 6 |
|  | Pcell No. 13 - Configuration No. 21 |
| Pcell No. 32 | Pcell No. 32 - Configuration No. 9 |
|  | Pcell No. 32 - Configuration No. 27 |
| Pcell No. 126 | Pcell No. 126 - Configuration No. 16 |
|  | Pcell No. 126 - Configuration No. 17 |
| Pcell No. 141 | Pcell No. 141 - Configuration No. 50 |
| Pcell No. 199 | Pcell No. 199 - Configuration No. 2 |
| ⋮ |  |
| Pcell No. X | Pcell No. X - Configuration No. Y |

| Pcells | Total Observed | Pcell Configurations | Total Observed |
|---|---|---|---|
| Pcell No. 1 | 200 | Pcell No. 1 - Configuration No. 1 | 50 |
| | | Pcell No. 1 - Configuration No. 2 | 150 |
| | | ⋮ | |
| | | Pcell No. 1 - Configuration No. X | 0 |
| Pcell No. 2 | 20 | Pcell No. 2 - Configuration No. 1 | 5 |
| | | Pcell No. 2 - Configuration No. 2 | 15 |
| | | ⋮ | |
| | | Pcell No. 2 - Configuration No. Y | 25 |
| Pcell No. 3 | 0 | Pcell No. 3 - Configuration No. 1 | 0 |

FIG. 4

| Flagged Pcell Or Pcell Configuration | Total Observed |
|---|---|
| Pcell No. 11 | 0 |
| Pcell No. 12 - Configuration No. 8 | 35 |
| Pcell No. 12 - Configuration No. 14 | 0 |
| Pcell No. 21 | 0 |
| ⋮ | |

FIG. 5

PROCESS DESIGN KIT (PDK) WITH DESIGN SCAN SCRIPT

BACKGROUND

Field of the Invention

The present invention relates to process design kits (PDKs) for integrated circuit (IC) designs and, more particularly, to development of PDK updates or upgrades.

Description of Related Art

More specifically, a process design kit (PDK) is a set of electronic files including both data and script files. It is typically developed by a semiconductor foundry for its customers in order to facilitate design of integrated circuits (ICs) at a specific technology node supported by the foundry. The electronic files are accessible by one or more electronic design automation (EDA) tools executed on a customer's computer network (e.g., on a computer-aided design (CAD) system) at different stages in the design flow. Exemplary PDK electronic files include, but are not limited to, simulation models, symbols and technology files for the specific technology node, a parameterized cell (Pcell) library, and design rule decks and associated initialization scripts for the different stages of the design flow (e.g., for floorplanning, power planning, input/output pin placement, library element placement, clock planning, wire routing, a layout versus schematic (LVS) check, 3D emulation, simulations, etc.).

For purposes of this disclosure, a "parameterized cell" (also referred to in the art as a template cell) represents an IC component and includes an executable parameter customization program (also referred to as a parameter customization script). The IC component represented by a specific pcell can be a single device (e.g., a transistor, capacitor, resistor, etc.) or multiple interconnected devices (e.g., a logic gate). The customization script allows one or more geometric parameters of one or more devices of an IC component represented by a pcell to be user-customized through a graphic user interface (GUI). Thus, if multiple instances of a specific pcell are inserted into an IC design, at least some of those instances may be user-customized so as to have different geometric parameter combinations (also referred to herein as different pcell configurations). For example, if multiple instances of a transistor pcell are inserted into an IC design, at least some of the different instances may be user-customized so as to have different channel length and width combinations (i.e., different pcell configurations).

Before a foundry releases a PDK upgrade to its customers, it typically performs regression analyses of the pcells in the library for quality assurance. Ideally, a regression analysis is performed for each possible configuration of each pcell included in the library and includes multiple tests/checks including, but not limited to: an old-versus-new layout regression check, a design rule check (DRC), and a layout-versus-schematic (LVS) check. However, a pcell library typically includes a relatively large number of pcells, each with a relatively large number of possible configurations given the user-customizable geometric parameters. As a result, the required processing time for and associated costs of performing regression analyses for all possible configurations of all pcells is highly impractical, if not impossible.

SUMMARY

In view of the foregoing, disclosed herein are embodiments of a process design kit (PDK) and of a computer-aided design (CAD) system that employs the PDK when executing electronic design automation (EDA) tools for developing integrated circuit (IC) designs. The PDK can include conventional PDK data and script files and also a design scan script. The design scan script can be executed by the CAD system to run a scan of previously developed and stored IC designs and to generate one or more different reports with one or more different types of cell use information (CUI) for those designs (i.e., information regarding the parameterized cells (pcells) used in the IC designs and the configurations thereof). Also disclosed herein are embodiments of a PDK development system. This system can receive CUI reports from multiple CAD systems and can compile the CUI to facilitate revising the PDK (e.g., developing an upgrade or, optionally, an update for the PDK). That is, the PDK can be revised based, in part, on the compiled CUI. For example, the complied CUI can be used to identify critical targets that should be subjected to a regression analysis during the PDK revision process and the PDK can be revised based, in part, on the results of the regression analyses of the identified critical targets. By limiting the regression analyses performed during PDK update or upgrade development to identified critical targets (as opposed to all pcells and pcell configurations), the processing time and costs associated with the regression analyses are significantly reduced such that the overall turn around time and costs associated with revising the PDK are also significantly reduced. Also disclosed herein are embodiments of methods implemented by the above-mentioned CAD and PDK systems.

More particularly, disclosed herein are embodiments of a process design kit (PDK) product. The PDK product can be in the form of a storage medium having a PDK embodied therewith (e.g., stored thereon). The storage medium can be computer-readable and, particularly, can be readable by a processor of a computer-aided design (CAD) system (e.g., a CAD system of a customer of a specific foundry). The PDK can be developed (e.g., by the specific foundry) for use in conjunction with electronic design automation (EDA) tools for designing integrated circuits (ICs) at a specific technology node (e.g., a specific technology node supported by the foundry). The PDK can include conventional PDK components (e.g., data and script files including simulation models, symbols and technology files for the specific technology node, a parameterized cell (Pcell) library, design rule decks and associated initialization scripts, etc.) and also a design scan script. The design scan script can be executable by the processor of the CAD system to cause the processor to perform a method. The method can include running a scan of IC designs, which were generated using the PDK and which can contain specific pcells selected from the library and user-customized so as to have corresponding custom configurations. The scan of these IC designs can be run in order to capture one or more different types of cell use information (CUI) (e.g., information regarding the pcells used in the IC designs and the configurations thereof). The method can further include generating one or more different reports indicating the different types of CUI, respectively, and outputting the report(s) for consideration (e.g., by a PDK developer or development team) when the PDK is being revised. For example, the method can include generating and outputting a first report with a first type of CUI, where the first type of CUI indicates critical targets, where each critical target is a particular parameterized cell with a particular custom configuration that requires a regression analysis when the PDK is being revised.

Also disclosed herein are embodiments of a computer-aided design (CAD) system (e.g., of a customer of a specific foundry). The CAD system can include at least one processor and at least one storage medium, which is readable by the processor. The storage medium can store a process design kit (PDK) and integrated circuit (IC) designs. The PDK can be developed (e.g., by the specific foundry) for use in designing ICs at a specific technology node (e.g., a specific technology node supported by the foundry). The PDK include conventional PDK components (e.g., data and script files including simulation models, symbols and technology files for the specific technology node, a parameterized cell (Pcell) library, design rule decks and associated initialization scripts, etc.) and also a design scan script. The IC designs can be designs, which were previously generated using the PDK (e.g., through the execution of electronic design automation (EDA) tools that employ the PDK) and which contain specific pcells selected from the library and user-customized so as to have corresponding custom configurations. The design scan script can also be executable by the processor and the processor, upon execution of the design scan script, can run a scan of the stored IC designs in order to capture cell use information (CUI) (e.g., information regarding the pcells used in the IC designs and the configurations thereof), generate one or more different reports indicating the different types of CUI, respectively, and output the report(s) for consideration (e.g., by a PDK developer or development team) when the PDK is being revised. For example, during execution of the design scan script, the processor can generate and output a first report with a first type of CUI, where the first type of CUI indicates critical targets, where each critical target is a particular parameterized cell with a particular custom configuration that requires a regression analysis when the PDK is being revised.

Also disclosed herein are embodiments of a process design kit (PDK) development system. The PDK development system can be employed (e.g., by a specific foundry) to develop and revise a PDK, which is used by one or more computer-aided design (CAD) systems (e.g., of one or more customers of the foundry) in conjunction with electronic design automation (EDA) tools to design ICs at a specific technology node (e.g., a specific technology node supported by the foundry). Specifically, the PDK development system can include an input that receives cell use information (CUI) reports from one or more CAD systems. Each CAD system stores integrated circuit (IC) designs that were generated using a process design kit and has executed a design scan script of the process design kit to run a scan of the store IC designs to capture one or more different types of cell use information (CUI) and to further generate and output one or more different report indicating the different types of CUI, respectively. For example, as discussed above, the report(s) can include at least a first report with a first type of CUI, where the first type of CUI indicates critical targets with each critical target being a particular parameterized cell with a particular custom configuration that requires a regression analysis when the PDK is being revised.

The PDK development system can further include at least one processor and at least one storage medium, which is readable by the processor. The storage medium can store a current version of a PDK (including all previous updates). The storage medium can also store the received cell use information (CUI) reports. For all received reports containing the same type of CUI, the processor can compile the CUI to facilitate revising the PDK (e.g., developing a PDK upgrade or update). That is, the revised PDK can be based, in part, on the compiled CUI.

For example, the processor can receive first reports with the first type of CUI. The first type of CUI in each first report can, as mentioned above, indicate critical targets with each critical target being a particular parameterized cell with a particular custom configuration that requires a regression analysis when the PDK is being revised. Specifically, the first type of CUI in each first report can include a list of all the different pcells observed within the stored IC designs of a CAD system and also, for each listed pcell, a single custom configuration when the IC designs include a single instance of the listed pcell or all different custom configurations when the IC designs include multiple instances of the listed pcell. In this case, the processor can compile the first type of CUI from all of the first reports such that the compiled first type CUI (e.g., in the form of a final report) includes a list of all the different pcells observed within the stored IC designs of one or more CAD systems that have submitted first CUI reports and again, for each listed pcell, a single custom configuration when the IC designs include a single instance of the listed pcell or all different custom configurations when the IC designs include multiple instances of the listed pcell. Thus, the compiled first type of CUI can indicate all of the critical targets (e.g., particular pcells and particular custom configurations thereof) that require a regression analysis when the PDK is being revised (e.g., when either developing an upgrade or, optionally, an update for the PDK). The processor can then cause regression analyses of those identified critical targets to be performed and the PDK can be revised based, at least in part, on the results of the regression analyses. By limiting the regression analyses to such identified critical targets, the processing time and costs are significantly reduced.

Also disclosed herein are embodiments of methods implemented by the above-described CAD and PDK development systems.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 3 shows an exemplary CUI report that includes observed pcells and pcell configurations and indistinguishable pseudo CUI;

FIG. 4 shows an exemplary CUI report that lists use statistics for all pcells and pcell configurations;

FIG. 5 shows an exemplary CUI report that lists use statistics for flagged pcells and/or pcell configurations only;

DETAILED DESCRIPTION

Figure 1A:
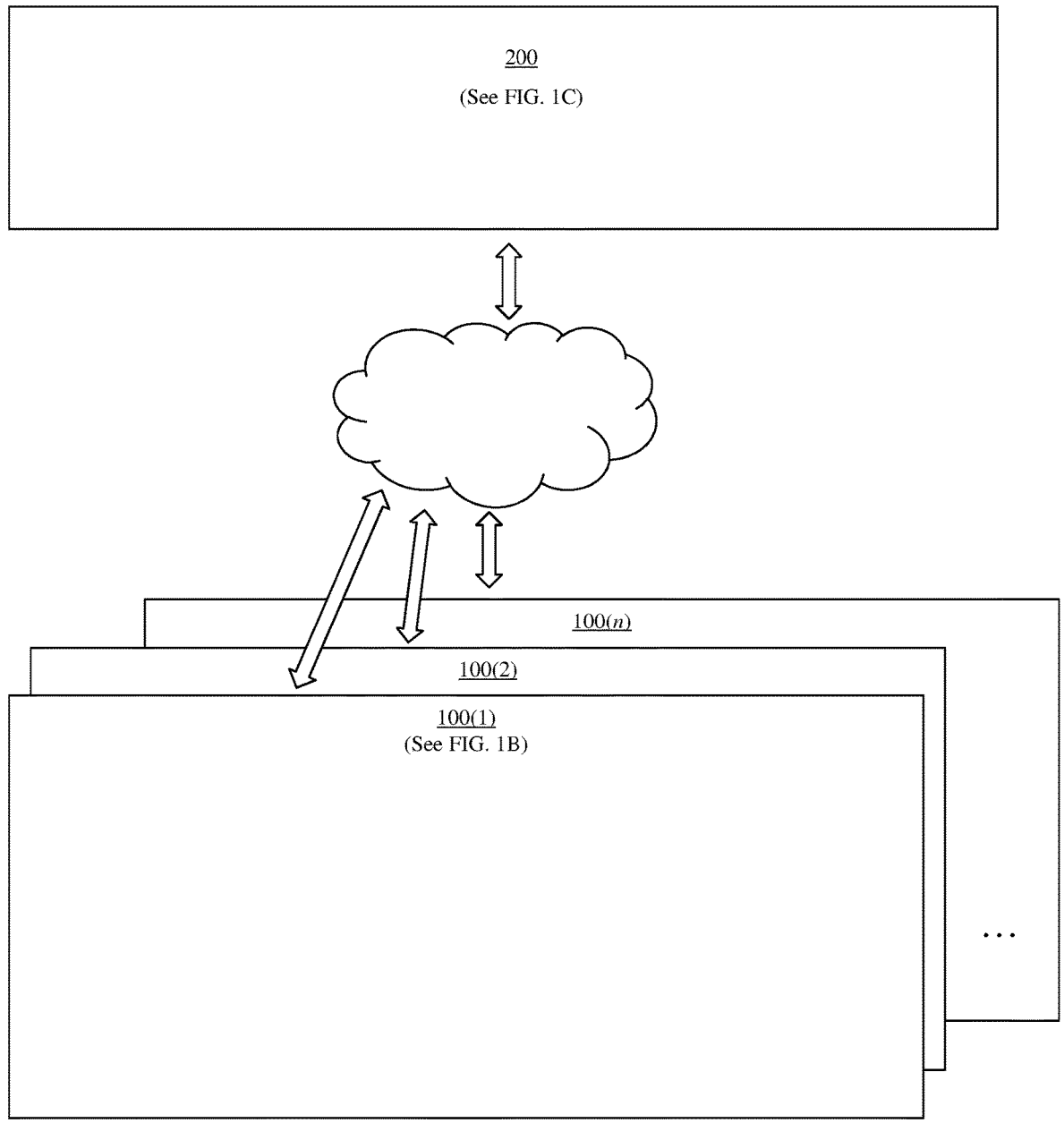
FIGS. 1A-1C illustrate an integrated circuit (IC) design environment including one or more computer-aided design systems that employ a process design kit (PDK) and a PDK development system.

As mentioned above, a process design kit (PDK) is a set of electronic files including both data and script files. It is provided by a semiconductor foundry to its customers in order to facilitate computer-aided design of integrated circuits (ICs) at a specific technology node supported by the foundry. Before a foundry releases a PDK upgrade to its customers, it typically performs regression analyses of parameterized cells (pcells) in a pcell library of the PDK for quality assurance. Ideally, a regression analysis is performed for each possible configuration of each pcell included in the library and includes multiple tests/checks including, but not limited to: an old-versus-new layout regression check, a design rule check (DRC), and a layout-versus-schematic (LVS) check. However, a pcell library typically includes a relatively large number of pcells, each with a relatively large number of possible configurations given the user-customizable geometric parameters. As a result, the required processing time for and associated costs of performing regression analyses for all possible configurations of all pcells is highly impractical, if not impossible.

In view of the foregoing, disclosed herein are embodiments of a process design kit (PDK) and of a computer-aided design (CAD) system that employs the PDK when executing electronic design automation (EDA) tools for developing integrated circuit (IC) designs. The PDK can include conventional PDK data and script files and also a design scan script. The design scan script can be executed by the CAD system to run a scan of previously developed and stored IC designs and to generate a report with cell use information (CUI) for those designs (i.e., information regarding the parameterized cells (pcells) used in the IC designs and the configurations thereof). Also disclosed herein are embodiments of a PDK development system. This system can receive CUI reports from multiple CAD systems and can compile the CUI to facilitate revising the PDK (e.g., developing an upgrade or, optionally, an update for the PDK). That is, the PDK can be revised based, in part, on the compiled CUI. For example, the complied CUI can indicate critical targets that require a regression analysis during the PDK revision process. It should be noted that compiled CUI could also be employed to identify obsolete/unused pcells or pcell configurations (e.g., so that they can be dropped from a pcell library in the PDK) and/or to predict customer demand for new pcells or pcell configurations (e.g., so that they can be added to the pcell library). By limiting the regression analyses performed during PDK update or upgrade development to identified critical targets (as opposed to all pcells and pcell configurations), the processing time and costs associated with the regression analyses are significantly reduced such that the overall turn around time and costs associated with revising the PDK are also significantly reduced. Furthermore, by enabling historical CUI and/or predicted user-demand to be considered when the PDK is being revised (e.g., when performing pcell regression analyses and when making library add/drop decisions), the disclosed embodiments ensure future customer-satisfaction with the IC design options available through and supported by the revised PDK and further maximize the likelihood that ICs manufactured according to IC designs developed using the revised PDK can be properly verified and validated, thereby maximizing product yield. Also disclosed herein are embodiments of methods implemented by the above-mentioned CAD and PDK systems.

Figure 1B:
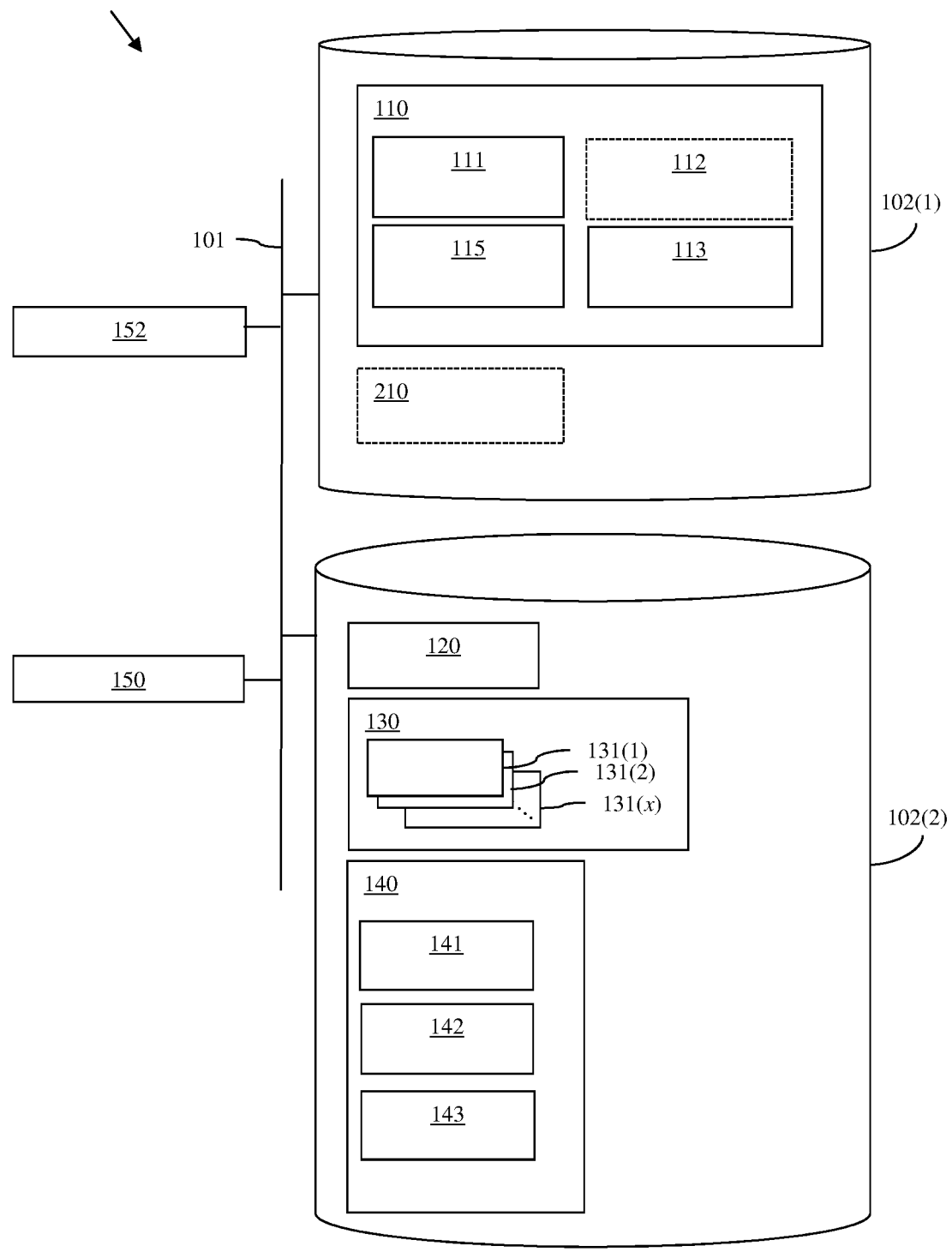
Figure 1C:
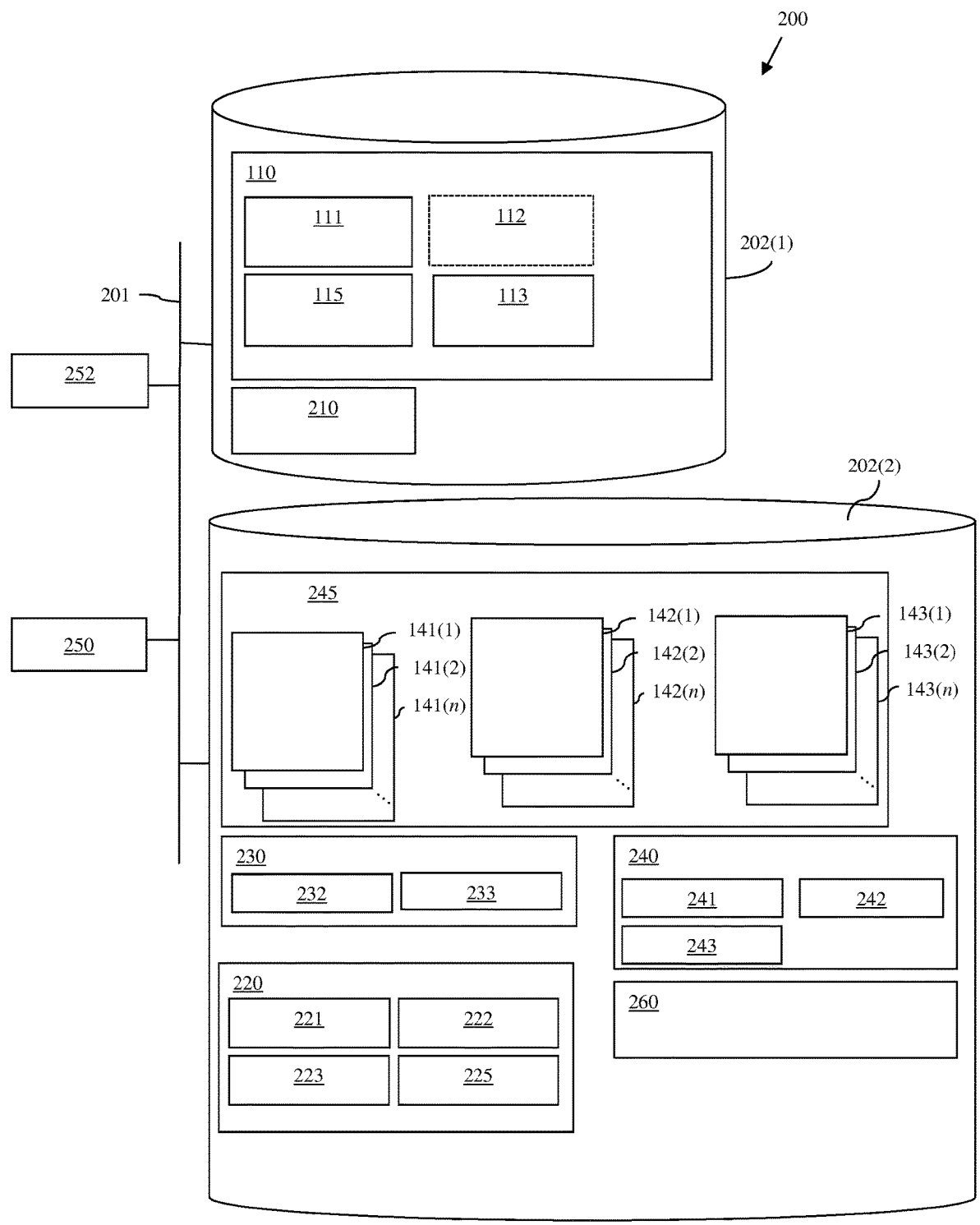

FIGS. 1A-1C illustrate an integrated circuit (IC) design environment within which the disclosed embodiments of the present invention are implemented. Specifically, disclosed herein are embodiments of: a process design kit (PDK) 110 product, which is developed and provided by a semiconductor foundry to its customer(s); computer-aided design (CAD) system(s) of the customer(s) (see CAD systems 100(1)-(n)), which execute electronic design automation (EDA) tools 120 that employ the PDK 110 in order to generate and store IC designs (e.g., see IC designs 131(1)-131(x)); and PDK development system 200 of the foundry, which is used to revise the PDK 110 (e.g., develop upgrades and updates for the PDK) for release to the customer(s)). For purposes of this disclosure, it should be understood that an "upgrade" for a PDK refers to a new version of the PDK that will replace the current version, whereas an "update" for a PDK refers to a modification to be installed in the current version of the PDK.

More specifically, disclosed herein are embodiments of a PDK 110 product. The PDK 110 can be developed (e.g., by a specific semiconductor foundry) for use by computer-aided design (CAD) systems 100(1)-(n) (e.g., of customers of the foundry) in conjunction with electronic design automation (EDA) tools 120 to design integrated circuits (ICs) at a specific technology node (e.g., the specific technology node supported by the foundry). Those skilled in the art will recognize that a technology node (also referred to as a process node) is typically identified in nanometers (e.g., a 45 nm, 32 nm, 22 nm, 14 nm, etc.), thereby indicating the size of the semiconductor features that can be formed on a semiconductor wafer at the foundry using the technology. The technology node may also indicate the type of wafer, such as a silicon-on-insulator (SOI) wafer (e.g., 45 nm SOI, 32 nm SOI, 22 nm SOI, etc.). In any case, the PDK product can be in the form of a computer readable storage medium having the PDK 110 embodied therewith (e.g., stored thereon). The PDK 110 can include various electronic files including conventional PDK components 111-113 (e.g., a parameterized cell (Pcell) library 111, an optional graphic user interface (GUI) 112, and other design data and script files 113 including simulation models, symbols and technology files for the specific technology node, design rule decks and associated initialization scripts, etc.), which are employed by the EDA tools 120 during IC design. In addition to these conventional PDK components, the PDK 110 can also include a design scan script 115 (see more detailed discussion below).

Also disclosed herein are embodiments of a computer-aided design (CAD) system (e.g., see generally the CAD systems 100(1)-100(n) of one or more customers shown in FIG. 1A and the more detailed illustration of any one of the CAD systems 100(1), 100(2), or 100(n) shown in FIG. 1B). The CAD system can include one or more processors 150, one or more displays 152, and one or more computer readable storage mediums or devices (e.g., see storage mediums 102(1)-102(2)), which are readable by the processor(s) 150. The various components of the CAD system including, but not limited to, the processor(s) 150, display(s) 152, and storage mediums(s) 102(1)-102(2) can be interconnected over a system bus 101, as illustrated, and/or over a wired or wireless network (not shown). Furthermore, the various components of the CAD system can be co-located. Alternatively, the CAD system can be a client-server system with a central server and multiple networked workstations. Alternatively, the CAD system can be a distributed system whose components are distributed across different networked computers. In any case, for purposes of illustration, the CAD system is illustrated in FIG. 1B as if it incorporates only a single processor 150, a single display 152, and two storage mediums 102(1)-102(2). However, it should be understood that, alternatively, the CAD system can incorporate multiple processors 150 for performing one or more of the different steps in the design flow, as discussed below, multiple displays 152, and any number of one or more storage mediums, which store the data and tools that are employed during the different steps in the design flow.

The storage medium 102(1) can store the PDK 110. As mentioned above, the PDK product can be in the form of a computer readable storage medium having the PDK 110 embodied therewith (e.g., stored thereon). The storage medium 102(1) shown in FIG. 1B can be the PDK product itself (e.g., a disk, flash drive, portable hard drive, etc.), having the PDK 110 stored thereon and being accessible by the CAD system through some interface (e.g., via a disk reader, USB port, or other interface, as appropriate). Alternatively, the PDK 110 can be loaded onto the storage medium 102(1) from the PDK product through an interface.

The storage medium 102(2) can store EDA tools 120 (also referred to herein as EDA programs or applications), which can be executed by the processor(s) 150 during different stages in a design flow to generate an IC design. The EDA tools 120 can include, but are not limited to, a pcell selection and customization tool, a schematics generation tool, a floorplanning tool, a power planning too, an input/output pin placement tool, a cell placement tool, a clock planning tool, a wire routing tool, a layout versus schematic (LVS) checking tool, design rule checking (DRC) tool(s), simulator(s), etc.). During execution of the EDA tools 120 by the processor(s) 150, the PDK 110 and user inputs can be employed by those tools 120 to aid in the design and to ensure subsequent verification and validation of the resulting IC designs. For example, as mentioned above, the PDK 110 can include the pcell library 111 and, when executing the EDA tools 120 and, particularly, a pcell selection and customization tool, specific pcells can be selected (e.g., by a user and, particularly, a designer through a GUI) for inclusion in the IC design and also customized (e.g., by the designer through the GUI) so that the specific pcell has a specific pcell configuration (e.g., a specific combination of geometric parameters). Additionally, as mentioned above, the PDK 110 can include design rule decks. Each rule deck or set of design rules is applicable to one or more of the particular processes in the design flow (e.g., pcell selection and customization, schematics generation, floorplanning, power planning, input/output pin placement, library element placement, clock planning, wire routing, a layout versus schematic (LVS) check, 3D emulation, simulations, etc.). Those skilled in the art will recognize that the design rules are determined based on process assumptions associated with the specific technology node at issue (e.g., critical dimensions at the different fabrication levels, expected results of process steps given the critical dimensions, etc.), based on various fail mechanisms that can occur in light of those process assumptions, etc. EDA tools 120 are well known in the art. Thus, the details thereof have been omitted from this specification in order to allow the reader to focus on the salient aspects of the disclosed embodiments.

The storage medium 102(2) can further store IC designs (e.g., see the different IC designs 131(1)-131(x)). Each stored IC design has been generated by the CAD system during execution of EDA tools 120 in design flows and using the PDK 110. As illustrated, the different IC designs 131(1)-131(x) can be stored in a single IC design folder 130. Alternatively, the different IC designs 131(1)-131(x) can be stored as discrete files or in different IC design folders. Furthermore, each of the stored IC designs 131(1)-131(x) can be accessible by the processor(s) 150 of the CAD system for subsequent processing (e.g., by other EDA tools 120 if the design flow has not been completed or by one or more scripts in the PDK 110).

For example, as mentioned above, a unique aspect of the disclosed PDK 110 is the design scan script 115. The design scan script 115 can be a set of instructions (or commands) that are executable by a processor 150 of the CAD system and that cause the processor 150 to perform a method.

The method can include running a scan of the previously generated and stored IC designs 131(1)-131(x) in order to capture cell use information (CUI) (e.g., information regarding the pcells used in the IC designs 131(1)-131(x) and the configurations thereof). As discussed in greater detail below, the scan can be run to capture one or more different types of CUI. The instructions can cause scans to be run on final IC designs generated at the completion of design flows just prior to tape out. A final IC design can be in a data format used for the exchange of layout data of integrated circuits and/or symbolic data format (e.g., GDSII, GL1, OASIS, map files, or any other suitable format for storing such design data structures). Additionally, the instructions can cause scans to be run on intermediate IC design generated at some earlier stage in the design flows and, particularly, after pcell selection and customization and before final IC design generation. Thus, each of the stored IC designs 131(1)-131(x) at issue in the application will at least contain specific pcells, which have been selected from the pcell library 111, which are identifiable within the IC design, and which also have corresponding, user-customized configurations (e.g., combinations of geometric parameters) that are also identifiable within the IC design.

The method can further include generating one or more different reports indicating the one or more different types of CUI, respectively (e.g., see the different CUI reports 141-143, discussed in greater detail below, which include different types of CUI), optionally storing the report(s) (e.g., in the CUI report folder 140) on the storage medium 102(2), and outputting the report(s) for consideration (e.g., by a PDK developer or development team) when revising the PDK 110 (e.g., when developing an upgrade for the PDK or, optionally, when developing an update for the PDK).

For example, the design scan script 115 can include instructions for scanning the IC designs 131(1)-131(x) in order to identify each different pcell (e.g., by a unique pcell identifier) within those IC designs and to further identify each different pcell configuration of each pcell (e.g., by a unique pcell configuration identifier). The unique identifiers can be identification numbers, names, descriptors, etc. The design scan script 115 can further include instructions for generating a first CUI report 141 with a first type of CUI given this type of scan. The first type of CUI can include, for example: a list of each different pcell observed within the IC designs 131(1)-131(x) (e.g., by pcell identification number) and, for each listed pcell, a single custom configuration (e.g., by pcell configuration identification number) when the IC designs include only a single instance of a listed pcell or all of the different custom configurations (e.g., by their respective pcell configuration identification numbers) when the IC designs include multiple instances of a listed pcell (e.g., see the exemplary first CUI report 141 shown in FIG. 2). Such a first CUI report 141 identifies the pcells and pcell configurations that are observed across the stored IC designs 131(1)-131(x) without indicating which pcells or pcell configurations are found in which designs and further without indicating the total number of instances of the pcells or pcell configurations.

Figure 2:
FIG. 2 shows an exemplary cell use information (CUI) report that identifies observed pcells and pcell configurations.

It should be noted that, since the specific details of the IC designs 131(1)-131(x) themselves or the number of instances of pcells or pcell configurations across the designs is not provided, this type of CUI report 141 curtails any reverse engineering based on the collected CUI and, thereby protects the customer's intellectual property. To further protect the customer's intellectual property, the design scan script 115 can also include instructions to automatically insert pseudo CUI into the report 141 prior to output. For example, in addition to the listed pcells and pcell configurations actually observed during the scan (e.g., as shown in FIG. 2), pseudo CUI and in this case randomly selected pcells and pcell configurations can be inserted into the list and can be indistinguishable from the actually observed pcells and pcell configurations listed (e.g., see the alternative CUI report 141 with inserted pseudo CUI 301 as shown in FIG. 3). Due to the inclusion of the pseudo CUI 301, the actual CUI is masked (i.e., hidden) even further curtailing any reverse engineering based on the collected CUI.

As discussed in greater detail below with regard to the PDK development system 200 and corresponding method, this first CUI report 141 (e.g., as shown in FIG. 2 with observed pcells and pcell configurations only or as shown in FIG. 3 with observed pcells and pcell configurations along with randomly selected pcells and pcell configurations thereof) and, optionally, other first CUI reports with the same first type of CUI from other the CAD systems (e.g., from the same or different customers of the foundry) can indicate the critical targets (i.e., the particular pcells and the particular custom pcell configurations thereof) that should be subjected to and, particularly, that require a regression analysis during the PDK revision process. By limiting the regression analyses to identified critical targets (as opposed to all configurations of all pcells), processing time and costs associated with the regression analyses are significantly reduced. It should be noted that, while randomly selected pcells and pcell configurations thereof (i.e., pseudo CUI) that are inserted into a report 141 to protect the customer's intellectual property will also be identified as critical targets and subjected to regression analyses, the total number of pcells and configurations thereof analyzed would still be significantly less that all configurations of all pcells.

Additionally or alternatively, the design scan script 115 can include instructions for scanning the IC designs 131(1)-131(*x*) in order to collect a second type of CUI and, particularly, cell use statistics (e.g., the number of instances observed) specifically for all pcells and pcell configurations thereof within the IC designs 131(1)-131(*x*). In this case, the design scan script 115 can further include instructions for generating a second CUI report 142 with the second type of CUI that includes, for example: a list of all pcells available in the pcell library 111 of the PDK 110; for each pcell listed, a total number of instances of the pcell in the IC designs 131(1)-131(*x*) and all possible configurations for the pcell; and for each configuration of the pcell, a total number of instances of the configuration (e.g., see the exemplary CUI report 142 shown in FIG. 4). As discussed in greater detail below with regard to the PDK development system 200 and corresponding method, this second CUI report 142, optionally other second CUI reports with the same second type of CUI received from other CAD systems (e.g., of the same or different customers of the foundry) and optionally historical CUI reports of the same type maintained in a historical database can be employed (e.g., by a PDK developer or development team) when revising the PDK 110 to identify critical targets that require a regression analysis (as discussed above) and also to predict user-demand for new pcells and configurations thereof and/or new configurations for previously available pcells.

Additionally or alternatively, the design scan script 115 can include instructions for scanning the IC designs 131(1)-131(*x*) in order to collect a third type of CUI and, particularly, cell use statistics for only one or more selected pcells and/or one or more selected pcell configurations within the IC designs 131(1)-131(*x*). The selected pcells and pcell configurations can be, for example, specific pcell(s) and/or specific pcell configuration(s) that have been flagged as obsolete (e.g., by a PDK developer or development team). Pcells or pcell configurations that have been flagged as obsolete cannot simply be dropped from a pcell library of the PDK during revision because customers may still be using the pcell or pcell configurations and require support. In this case, the design scan script 115 can further include instructions for generating a third CUI report 143 with a third type of CUI that includes, for example: for each specific pcell or specific pcell configuration, which is selected (e.g., flagged as obsolete), the total number of instances of that specific pcell or specific pcell configuration in the IC designs 131(1)-131(*x*) (e.g., see the exemplary CUI report 143 shown in FIG. 5). As discussed in greater detail below with regard to the PDK development system 200 and corresponding method, the third CUI report 143 and optionally other third CUI reports of with the same third type of CUI from other CAD systems (e.g., of the same or different customers of the foundry) can be employed (e.g., by a PDK developer or development team) when revising the PDK 110 and, particularly, when determining whether or not to drop the specific pcell(s) or the specific pcell configuration(s) from the pcell library 111.

In one embodiment, execution of the design scan script 115 by the processor 150 can be initiated only on-demand by a user of the CAD system. For example, the PDK 110 can be configured such that the user can enter (type) a specific command into the CAD system in order to force execution of the design scan script 115 by the processor 150 and, thereby force the running of the scan and the generation of the CUI report. In this embodiment, execution of the design scan script 115 can optionally further cause the processor 150 to automatically display the CUI report in a user-readable text file format on a display 152 and require user-approval of the report prior to outputting it for consideration by the PDK developer or development team when revising the PDK. In this embodiment, execution of the design scan script 115 can further cause the processor 150 to automatically perform a particular type of scan, to automatically insert the pseudo CUI into the CUI report (as discussed above) and/or to automatically encrypt the CUI report prior to outputting it for consideration by the PDK developer or development team when revising the PDK.

It should be understood that encrypting of a CUI report (and subsequent decryption) can be performed using any suitable encryption/decryption tool. Such tools are well known in the art and, thus, the details thereof have been omitted from this specification in order to allow the reader to focus on the salient aspects of the disclosed embodiments.

In other embodiments the PDK 110 could include a GUI 112 that is configured to enable a user to select particular settings and/or menu options with respect to execution of the design scan script 115. Such design scan settings or menu options could provide for authorization from a user or administrator of the CAD system prior to running any scan of the stored IC designs 131(1)-131(*x*). For example, a default scan setting could prohibit running scans and other user-selectable scan settings could include: on-demand scans only; on-demand scans by only specifically identified and authorized users; automatic scans run periodically (e.g., monthly, yearly, etc.); automatic scans run at scheduled dates/times; automatic scans triggered by identified event(s)

(e.g., storage of a new IC design); etc. Other user-selectable scan settings could provide for selection of the scan/report type. For example, if/when the design scan script 115 is configured to perform all of the above-described types of scans in order to generate all of the above-discussed types of CUI reports 141-143, then the user-selectable scan settings could also allow the user to identify which of the different types of scans/reports are authorized and how. The design scan settings or menu options could also provide for authorization from a user or administrator of the CAD system prior to outputting any CUI report and for encrypting the CUI report prior to output. For example, a default output setting could prohibit outputting any CUI report and other user-selectable options could include: output only with user-authorization for each CUI report; output only with user-authorization for each CUI report following review (e.g., of the CUI report in a user-readable text file displayed on a display 152); output automatically; output only after encrypting; etc. Other user-selectable output options could be directed to how the CUI reports are output for consideration during revising of the PDK: upload directly to a PDK development system 200; email to a PDK developer or development team; allow a PDK developer or development team to access and download; print and mail to a PDK developer or development team; etc.

Also disclosed herein are embodiments of a process design kit (PDK) development system (e.g., see generally the PDK development system 200 in FIG. 1A and the more detailed illustration o shown in FIG. 1C). The PDK development system 200 can be employed (e.g., by a PDK developer or development team for a specific foundry) to assist with PDK development and revision. The PDK development system 200 can include one or more processors 250, one or more displays 252, and one or more computer readable storage mediums or devices (e.g., see storage mediums 202(1)-202(2)), which are readable by the processor(s) 250. The various components of the PDK development system 200 including, but not limited to, the processor(s) 250, display(s) 252, and storage mediums(s) 202(1)-202(2) can be interconnected over a system bus 201, as illustrated, and/or over a wired or wireless network (not shown). Furthermore, the various components of the PDK development system 200 can be co-located. Alternatively, the PDK development system 200 can be a client-server system with a central server and multiple networked workstations. Alternatively, the PDK development system 200 can be a distributed system whose components are distributed across different networked computers. In any case, for purposes of illustration, the PDK development system 200 is illustrated in FIG. 1C as if it incorporates only a single processor 250, a single display 252, and two storage mediums 202(1)-202(2). However, it should be understood that, alternatively, the PDK development system 200 can incorporate multiple processors 250 for performing one or more different steps during the PDK development and revision, as discussed below, multiple displays 252, and any number of one or more storage mediums, which store the data and tools that are employed during the different steps of PDK development and revision.

The storage medium 202(1) can store the PDK 110 and, particularly, at least the current version (including all previous updates) of the PDK 110. See the detailed discuss above regarding the various features of the PDK 110.

The storage medium 202(2) can store cell use information (CUI) reports (e.g., in the CUI report folder 245). As discussed in detail above with regard to the PDK 110 and the CAD system(s) 100(1)-100(n), CUI reports can be received by the PDK development system 200 from one or more CAD systems (e.g., of one or more customers of the foundry) either directly (e.g., uploaded from the CAD systems) or indirectly (e.g., acquired by a PDK developer or development team and entered into the system 200). In any case, each CAD system will have executed EDA tools and, during execution of the EDA tools, employed the PDK 110 to generate and store IC designs (e.g., in an IC design folder). Additionally, each CAD system will also have executed a design scan script 115 of the PDK 110 to run a scan of the stored IC designs 130(1)-130(x) to capture CUI (e.g., information regarding the pcells used in the IC designs and the configurations thereof) and to generate and output one or more different reports indicating one or more different types of CUI, respectively.

As discussed in detail above with regard to the PDK 110 and the CAD system(s) 100(1)-100(n), the types of CUI reports received by the PDK development system 200 from the CAD system(s) 100(1)-100(n) can vary. For purposes of illustration, the report folder 245 shows all three types of CUI reports from all of the CAD system 100(1)-100(n) including: first CUI reports 141(1)-141(n) (Listing with Optional Pseudo CUI), second CUI reports 142(1)-142(n) (Use Statistics—All) and third CUI reports 143(1)-143(n) (Use Statistics—Selected).

Each first CUI report 141(1)-141(n) from each CAD system 100(1)-100(n), respectively, can include a first type CUI. The first type of CUI can indicate critical targets, where each critical target is a particular pcell with a particular custom pcell configuration that requires a regression analysis when the PDK is being revised. Specifically, the first type of CUI in each first report can include: a list of each different pcell observed within the IC designs 131(1)-131(x) of that CAD system (e.g., by pcell identification number) and, for each listed pcell, a single custom configuration (e.g., by pcell configuration identification number) when the IC designs include only a single instance of a listed pcell or all of the different custom configurations (e.g., by their respective pcell configuration identification numbers) when the IC designs include multiple instances of a listed pcell (e.g., see the exemplary first CUI report 141 shown in FIG. 2). Optionally, in addition to the listed pcells and pcell configurations actually observed, any first CUI report 141(1)-141(n) from any CAD system 100(1)-100(n), respectively, can include pseudo CUI and, particularly, pcells and pcell configurations that were randomly selected and inserted into the report so as to be indistinguishable from the actually observed pcells and pcell configurations listed (e.g., see the alternative first CUI report 141 with inserted pseudo CUI 301 as shown in FIG. 3).

Each second CUI report 142(1)-142(n) from each CAD system 100(1)-100(n), respectively, can include a second type of CUI. The second type of CUI in each second report can include cell use statistics for all pcells and pcell configurations. That is, the second type of CUI can include a list of all pcells available in the pcell library 111 of the PDK 110; for each pcell listed, a total number of instances of the pcell in the IC designs 131(1)-131(x) of that CAD system and all possible configurations for the pcell; and, for each configuration of the pcell, a total number of instances of the pcell configuration in the IC designs 131(1)-131(x) of that CAD system (e.g., see the exemplary CUI report 142 shown in FIG. 4).

Each third CUI report 143(1)-143(n) from each CAD system 100(1)-100(n), respectively, can include a third type of CUI. The third type of CUI in each third report can include cell use statistics for specific pcells and/or pcell configurations. That is, the third type of CUI can include a listing of specific pcells and/or specific pcell configurations that were selected (e.g., flagged by a PDK developer or development team as obsolete); and for each listed specific pcell or specific pcell configuration, the total number of instances of the specific pcell or specific pcell configuration in the IC designs $131(1)$-$131(x)$ of that CAD system (e.g., see the exemplary CUI report 143 shown in FIG. 5).

Optionally, any one or more of the above-mentioned CUI reports $141(1)$-$141(n)$, $142(1)$-$142(n)$ and $143(1)$-$143(n)$ can be encrypted.

Within the PDK development system 200, the processor(s) 250 can compile the CUI of the same type from the CUI reports from CAD system(s). For example, a processor 250 can compile the first type CUI from the first CUI reports $141(1)$-$141(n)$, can compile the second type CUI from the second CUI reports $142(1)$-$142(n)$ and/or can compile the third type CUI form the third CUI reports $143(1)$-$143(n)$. The compiled first CUI, compiled second CUI and/or the compiled third CUI can subsequently be used by the processor(s) to facilitate revising the PDK 110 (e.g., developing a PDK upgrade or update). That is, a PDK upgrade or update can be developed based, in part, on the compiled CUI.

More specifically, the storage medium 202(2) can further store various tools including, but not limited to, report processing tools 230, PDK regression analysis tools 220, and additional tools 260.

The report processing tools 230 can include a CUI compiler tool 232. For each type of CUI report, the CUI compiler tool 232 can be configured to compile (e.g., can include a set of instructions that when executed by a processor 250 will cause the processor to compile) all of the CUI contained in the received and stored CUI reports and to further generate a final report with the compiled CUI.

Figure 6:
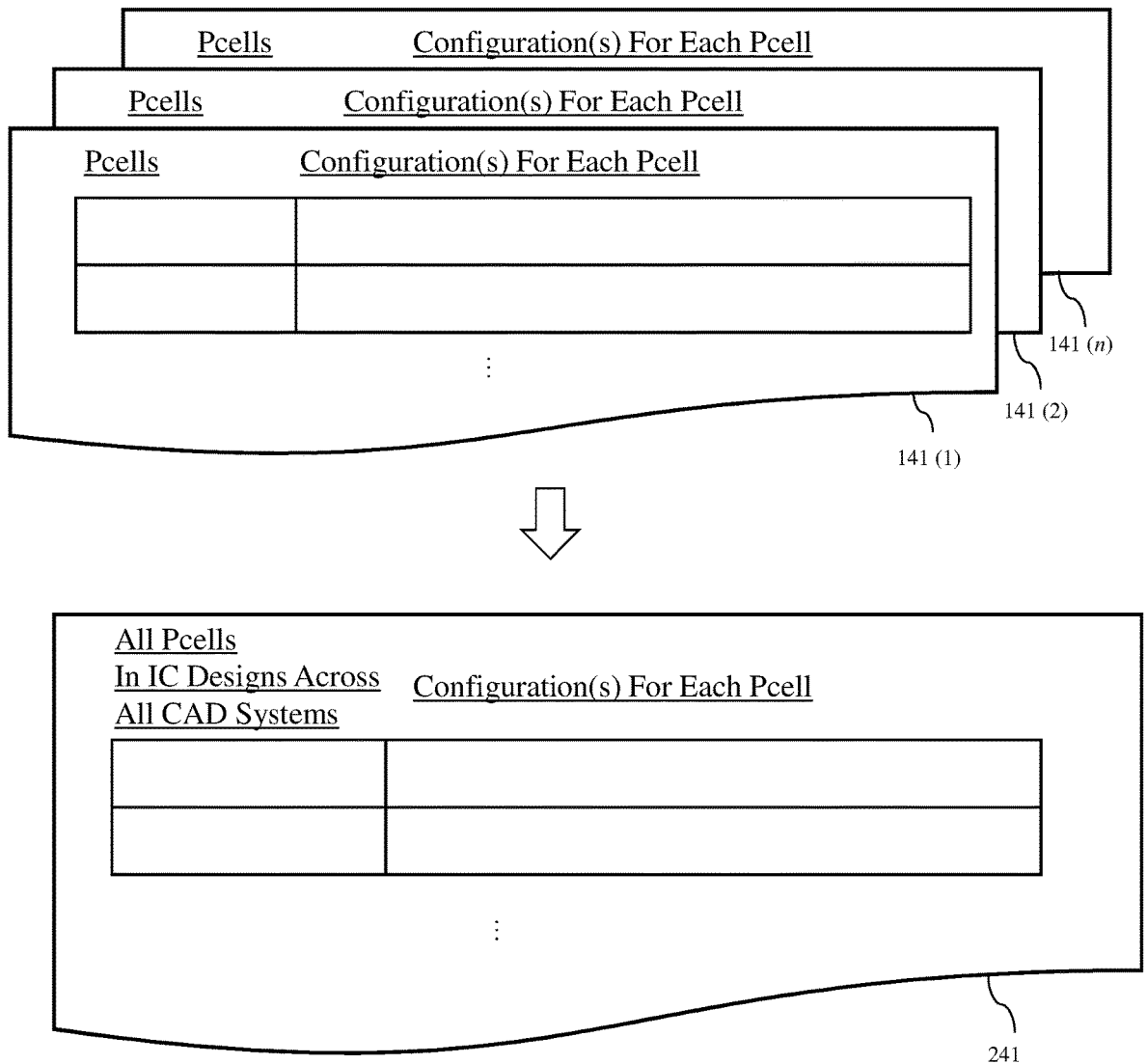
FIG. 6 illustrates compiling of multiple CUI reports, such as the CUI reports shown in FIG. 2, compiled into a single final report with compiled CUI.

For example, as illustrated in FIG. 6, the first type of CUI in the received and stored first CUI reports $141(1)$-$141(n)$ can be compiled or combined into a single final report 241 with compiled first type CUI. The compiled first type CUI in this final report 241 can include: a list of each different pcell observed within the stored IC designs $131(1)$-$131(x)$ of the CAD systems $100(1)$-$100(n)$ and, for each listed pcell in this final report, a single custom configuration when the IC designs across all of the CAD systems include only a single instance of a listed pcell or all of the different custom configurations when the IC designs across all of the CAD systems include multiple instances of a listed pcell. It should be understood that if, in addition to the listed pcells and pcell configurations actually observed, any of the first CUI reports $141(1)$-$141(n)$ from any of the CAD system $100(1)$-$100(n)$ include pseudo CUI so will the final report 241 with compiled first type CUI.

Similarly, the second type of CUI from the second CUI reports $142(1)$-$142(n)$ can be compiled or combined into a single final report 242 with compiled second type CUI. The compiled second type CUI in this final report 242 can include: a list of all pcells available in the pcell library 111 of the PDK 110; for each pcell listed, a total number of instances of the pcell in the IC designs $131(1)$-$131(x)$ of the CAD systems $100(1)$-$100(n)$, respectively; all possible configurations for the pcell; and for each configuration of the pcell, a total number of instances of the configuration in the IC designs $131(1)$-$131(x)$ of the CAD systems $100(1)$-$100(n)$.

Similarly, the third type of CUI from the third CUI reports $143(1)$-$143(n)$ can be compiled or combined into a single final report 243 with compiled third type CUI. The compiled third type CUI in this final report 243 can include: the listing of specific pcells and/or specific pcell configurations that were selected (e.g., flagged by a PDK developer or development team as obsolete); and for each listed specific pcell or specific pcell configuration, the total number of instances of the specific pcell or specific pcell configuration in the IC designs $131(1)$-$131(x)$ of the CAD systems $100(1)$-$100(n)$.

It should be understood that, if any of the received CUI reports are encrypted, appropriate encryption/decryption software can be employed to decrypt the reports prior to compiling the CUI, as discussed above.

The report processing tools 230 can further include a compiled CUI analysis tool 233 that is configured to analyze (e.g., that includes a set of instructions that when executed by a processor 250 causes the processor 250 to analyze) the compiled CUI in any of the final reports. It should be understood that the analysis and subsequent actions taken during PDK revision development would vary depending upon the type of compiled CUI in the final report at issue.

For example, the compiled first type CUI in the final report 241, which includes a list of the different pcells and pcell configurations used across all of the CAD systems, can be analyzed or reviewed by the compiled CUI analysis tool 233 to identify critical targets (i.e., particular pcells and particular custom pcell configurations thereof), given a set of critical target identification rules established by the PDK developer or development team. For example, the rules can specify that the critical targets will include any listed pcell on the final report 241 and all possible pcell configurations for the listed pcells. Alternatively, the rules can specify that the critical targets will include only listed pcell configurations of listed pcells on the final report 241. Alternatively, the rules can define the critical targets in any other manner deemed suitable by the PDK developer or development team.

The identified critical targets can then be subjected to regression analyses, respectively, by the PDK regression analysis tools 220. The PDK regression analysis tools 220 can include, but are not limited to: an old-versus-new layout regression check tool 221, a design rule check (DRC) tool 223, and a layout-versus-schematic (LVS) check tool 222. Optionally and depending upon the proposed revision, a parasitic extraction (PEX) test tool 225 (which is typically employed for overall PDK validation) could also be used. Such tools are well known in the art and, thus, the details thereof have been omitted from the specification in order to all the reader to focus on the salient aspects of the disclosed embodiments. However, generally, it should be understood that an old-versus-new layout regression check tool 221, when executed, is used to compare layouts for the given pcell configuration in the current PDK to the same pcell configuration in the upgrade or update in order to validate the given pcell configuration in the upgrade or update. A DRC tool 223, when executed, is used to confirm that the given pcell configuration in the upgrade or update meets design rules in order to validate the given pcell configuration in the upgrade or update. A LVS check tool 222, when executed, is used to confirm that the layout for the given pcell configuration in the upgrade or update matches the schematic in order to validate the given pcell configuration in the upgrade or update. A PEX tool 225, when executed, is used to check parasitic resistances and capacitances.

It should further be understood that the unique aspect of the disclosed PDK development system 200 is not in the regression analysis tools themselves, but instead in analyzing the final report 241 with compiled first type CUI in order to identify critical targets on which a regression analysis should be performed. As a result, processing time and costs associated with the regression analyses required during PDK update or upgrade development are significantly reduced. Furthermore, even if randomly selected pcells and/or pcell configurations have been inserted into the CAD-specific first CUI reports (as pseudo CUI) and, thus, included in the final report 241 with compiled first type CUI and identified as critical targets that require a regression analysis, the total number of pcells and pcell configurations thereof subjected to regression analyses by the tools 220 will still be significantly less than if all configurations of all pcells where subjected to regression analyses.

In this case, revising the PDK 110 can be performed (e.g., by a PDK developer or development team using text editing or other tools 260) based, at least in part, on the results of the regression analyses of the identified critical targets. The revisions or edits can be made automatically and/or in response to PDK developer or development team inputs through a GUI when it is determined that pcells or pcell configurations in the upgrade or update of the PDK can not be validated by the various checks.

The compiled second type CUI in the final report 242, which includes use statistics for all pcells and all pcell configurations (e.g., for one or more CAD systems of one or more customers) and, optionally, historical CUI reports of the same type can be subjected to machine learning by the compiled CUI analysis tool 233. In this case, compiled CUI analysis tool 233 can be configured to identify critical targets (i.e., particular pcells and particular custom pcell configurations thereof) that require a regression analysis (e.g., as discussed above) and also to perform machine learning (e.g., can include a set of instructions that when executed by a processor 250 can perform machine learning) based on the compiled second type CUI in order to predict user-demand for new pcell(s) and/or new pcell configuration(s) (i.e., selectable option(s) for geometric parameter combinations) for previously available pcells based on the use statistics. In this case, revising the PDK 110 can be performed (e.g., by a PDK developer or development team using text editing or other tools 260) based on the results of the machine learning performed by the compiled CUI analysis tool 233 and, particularly, based the predicted user-demand. For example, revisions or edits can be made automatically and/or in response to PDK developer or developer team inputs through a GUI and can include adding new pcell(s) or new pcell configuration(s) to the pcell library as a part of the PDK upgrade or update.

The compiled third type CUI in the final report 243, which includes use statistics for specific pcell(s) or specific pcell configuration(s) (e.g., which have been flagged as obsolete), can be analyzed by the compiled CUI analysis tool 233 to determine whether or not the specific pcell(s) or specific pcell configurations are completely out of use (i.e., not observed in any of the IC designs of any of the CAD systems) or, alternatively, whether or not the specific pcell(s) or specific pcell configurations meet some minimum use threshold requirement for retention. In this case, revising the PDK 110 can be performed (e.g., by a PDK developer or development team using text editing or other tools 260) based on the results of the analysis performed by the compiled CUI analysis tool 233 and, particularly, based on the complete absence of the specific pcell(s) or specific pcell configuration(s) from the final report 243 with compiled third type CUI or based on a failure to meet the minimum use threshold requirement for retention. For example, revisions or edits can be made automatically and/or in response to PDK developer or developer team inputs through a GUI and can include dropping the specific pcell(s) or the specific pcell configuration(s) from the pcell library in the PDK upgrade or update.

The revised PDK 210 (e.g., the PDK upgrade or update) can be stored (e.g., on the storage medium 202(1)) and further output to CAD system(s) (e.g., automatically or upon request following notification of revised PDK availability). The revised PDK 210 can subsequently be stored on the storage medium 102(1) of the CAD system(s), replacing the PDK 110 in the case of an upgrade or modifying of the PDK in the case of an update, and can be employed during subsequent design of ICs.

By limiting the regression analyses performed during PDK update or upgrade development to identified critical targets (as opposed to all pcells and pcell configurations), the processing time and costs associated with the regression analyses are significantly reduced such that the overall turn around time and costs associated with revising the PDK are also significantly reduced. Furthermore, by enabling historical CUI and/or predicted user-demand to be considered when revising the PDK (e.g., when performing pcell regression analyses and when making library add/drop decisions), future customer-satisfaction with the IC design options available through and supported by the revised PDK 210 is ensured and the likelihood that ICs manufactured according to IC designs developed using the revised PDK 210 can be properly verified and validated is maximized, thereby maximizing product yield.

Figure 7:
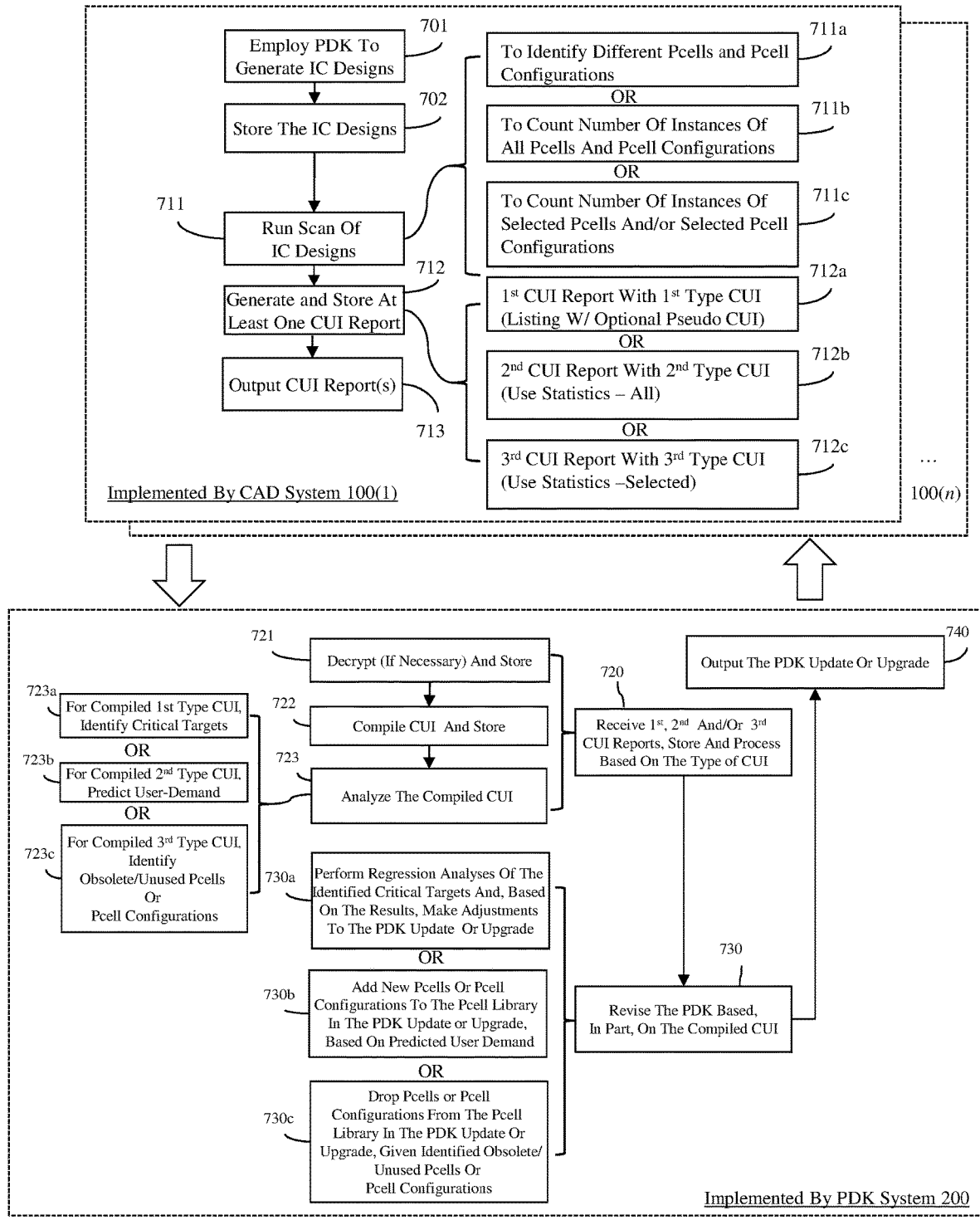
FIG. 7 is a flow diagram illustrating methods implemented by the above-described CAD system(s) and PDK system.

Referring to the flow diagram of FIG. 7, also disclosed herein are embodiments of methods implemented on systems 100(1)-100(n) and 200 in an integrated circuit (IC) design environment as described in detail above and illustrated in FIGS. 1A-1C).

Specifically, a method implemented by one or more CAD systems 100(1)-100(n) of one or more customers of a foundry can include executing EDA tools 120 and, during execution of the EDA tools 120, employing a PDK 110 and user inputs to generate and store IC designs 130(1)-130(x) on a storage medium 102(2) (e.g., see process steps 701-702).

The method can further include executing a design scan script 115 of the PDK 110 to run a scan of the previously generated and stored IC designs 131(1)-131(x) in order to capture one or more different types of cell use information (CUI) (e.g., information regarding the pcells used in the IC designs 131(1)-131(x) and the configurations thereof), to generate one or more different reports indicating the different types of CUI, respectively (e.g., see the different types of CUI reports 141-143, discussed in greater detail below), to store the CUI report(s) (e.g., in the CUI report folder 140) on the storage medium 102(2) and to output the report(s) for consideration (e.g., by a PDK developer or development team) when revising the PDK 110 (e.g., when developing an upgrade for the PDK or, optionally, when developing an update for the PDK) (see process steps 711-713).

For example, running the scan of the IC designs 131(1)-131(x) can be performed in order to identify each different pcell (e.g., by a unique pcell identifier) within those IC designs and to further identify each different pcell configuration of each pcell (e.g., by a unique pcell configuration identifier) (see process step 711a). In this case, a first CUI report with a first type of CUI can be generated. The first type of CUI can indicate critical targets with each critical target being a particular pcell with a particular custom pcell configuration that requires a regression analysis when the PDK is being revised. Specifically, the first type of CUI can include: a list of each different pcell observed within the IC designs 131(1)-131(x) (e.g., by pcell identification number) and, for each listed pcell, a single custom configuration (e.g., by pcell configuration identification number) when the IC designs include only a single instance of a listed pcell or all of the different custom configurations (e.g., by their respective pcell configuration identification numbers) when the IC designs include multiple instances of a listed pcell (e.g., see process step 712a and the exemplary CUI report 141 shown in FIG. 2). Optionally, to protect the customer's intellectual property, generating a first CUI report at process step 712a can also include automatically inserting pseudo CUI into the first CUI report 141. For example, in addition to the listed pcells and pcell configurations actually observed during the scan (e.g., as shown in FIG. 2), pseudo CUI and, particularly, randomly selected pcells and pcell configurations can be inserted into the list such that it is indistinguishable from the actually observed pcells and pcell configurations listed (e.g., see the alternative CUI report 141 with inserted pseudo CUI 301 as shown in FIG. 3). Due to the inclusion of the pseudo CUI 301, the actual CUI is masked (i.e., hidden).

Additionally or alternatively, running the scan of the IC designs 131(1)-131(x) can be performed in order to collect cell use statistics (e.g., the number of instances observed) specifically for all pcells and pcell configurations thereof within the IC designs 131(1)-131(x) (see process step 711b). In this case, a second CUI report with second type CUI information can be generated. The second type of CUI can include a list of all pcells available in the pcell library 111 of the PDK 110; for each pcell listed, a total number of instances of the pcell in the IC designs 131(1)-131(x) and all possible configurations for the pcell; and for each configuration of the pcell, a total number of instances of the configuration (see process step 712b and, for example, the exemplary second CUI report 142 shown in FIG. 4).

Additionally or alternatively, running the scan of the IC designs 131(1)-131(x) can be performed in order to collect cell use statistics for only one or more selected pcells and/or one or more selected pcell configurations within the IC designs 131(1)-131(x) (see process step 711c). The selected pcells and pcell configurations can be, for example, specific pcell(s) and/or specific pcell configuration(s) that have been flagged as obsolete (e.g., by a PDK developer or development team). Pcells or pcell configurations that have been flagged as obsolete cannot simply be dropped from a pcell library of the PDK during revision because customers may still be using the pcell or pcell configurations and require support. In this case, a third CUI report that includes a third type of CUI can be generated. The third type of CUI can include a list of the selected specific pcells and/or specific pcell configurations and indicating the total number of instances of each in the IC designs 131(1)-131(x) (see process step 712c and, for example, the exemplary third CUI report 143 shown in FIG. 5).

Optionally, this method can include requiring user or administrator authorization prior to running any scan of the stored IC designs 131(1)-131(x) and/or prior to outputting any CUI reports. For example, a user or administrator could initiate running of the scan and/or outputting of the report only upon receipt of a specific command entered (e.g., typed) into the CAD system by the user or administrator. Alternatively, scan and/or output instructions could be provided by a user or administrator through menu or setting selections on a graphic user interface including, for example, selections specifying authorization for: scan/report type; for on-demand scans only; for on-demand scans by only specifically identified and authorized users; for automatic scans run periodically (e.g., monthly, yearly, etc.); for automatic scans run at scheduled dates/times; automatic scans triggered by identified event(s) (e.g., storage of a new IC design); etc. Optionally, this method can include providing the CUI report(s) to a user or administrator for review and approval (e.g., in a user-readable text file displayed on a display 152) and/or encrypting the CUI report(s) prior to outputting at process 713.

A method implemented by on a system 200 of a PDK developer or PDK development team of a foundry (referred to herein as a PDK development system) can include storing the current version (including all previous updates) of a PDK 110 on a storage medium 202(1) of the PDK development system 200.

This method can further include receiving, storing and processing cell use information (CUI) reports by type (see process step 720). Specifically, the first, second and/or third CUI reports described above can be received at an input device of the PDK development system 200 from one or more CAD systems of one or more customers of the foundry (e.g., see CUI reports 141(1)-141(n), 142(1)-142(n), and 143(1)-143(n) received from CAD systems 100(1)-100(n), respectively). The received CUI reports can be stored, for example, in a CUI report folder 245 on a storage medium 202(2) of the PDK development system 200). Processing of the CUI reports by type at process step 720 can include executing (e.g., by one or more processors 250 of the PDK development system 200) various CUI report processing tools 230 (e.g., an encryption/decryption tool (if necessary), a compiling tool 232, and an analysis tool 233) to cause the processor(s) 250 to decrypt (if necessary), compile and analyze the CUI reports (see process steps 721-723).

This method can further include revising the PDK 110 (see process step 730). Revising of the PDK 110 at process step 730 can include executing (e.g., by one or more processors of the PDK development system 200) one or more tools (e.g., regression analysis tools 220 and text editing and other tools 260) that can facilitate editing of the PDK 110 (i.e., facilitate development of an upgrade or update for the PDK 110) by a PDK developer or PDK development team based, at least in part, on the compiled CUI or, more particularly, the results of the analysis thereof.

Specifically, processing the CUI reports can include, for example, decrypting the CUI reports 141(1)-141(n), 142(1)-142(n) and 143(1)-143(n), as necessary, prior to further processing (see process step 721).

Processing the CUI reports can further include compiling all of the CUI contained in the reports having the same type of CUI and generating and storing a final report for that type of CUI (see process step 722).

For example, as illustrated in FIG. 6, all of the first type CUI from the received and stored first CUI reports 141(1)-141(n) can be compiled or combined at process step 722 into a single final report 241 with compiled first type CUI. The compiled first type CUI in this final report 241 can indicate all of the critical targets that should be subjected to regression testing when the PDK is being revised. Specifically, the compiled first type CUI can include a list of each different pcell observed within the stored IC designs 131(1)-131(x) of the CAD systems 100(1)-100(n) and, for each listed pcell in this final report, a single custom configuration when the IC designs across all of the CAD systems include only a single instance of a listed pcell or all of the different custom configurations when the IC designs across all of the CAD systems include multiple instances of a listed pcell. It should be understood that if, in addition to the listed pcells and pcell configurations actually observed, any of the CUI reports 141(1)-141(n) from any of the CAD system 100(1)-100(n) include pseudo CUI so will the final report 241 with compiled CUI.

Additionally or alternatively, all of the second type of CUI from all of the second CUI reports 142(1)-142(n) can be compiled or combined at process step 722 into a single final report 242 with compiled second type CUI. The compiled second type CUI in this final report 242 can include: a list of all pcells available in the pcell library 111 of the PDK 110; for each pcell listed, a total number of instances of the pcell in the IC designs 131(1)-131(x) of the CAD systems 100(1)-100(n), respectively; all possible configurations for the pcell; and for each configuration of the pcell, a total number of instances of the configuration in the IC designs 131(1)-131(x) of the CAD systems 100(1)-100(n).

Additionally or alternatively, all of the third type of CUI from all of the third CUI reports 143(1)-143(n) can be compiled or combined at process step 722 into a single final report 243 with compiled third type CUI. The compiled third type CUI in this final report 243 can include: the listing of specific pcells and/or specific pcell configurations that were selected (e.g., flagged by a PDK developer or development team as obsolete); and for each listed specific pcell or specific pcell configuration, the total number of instances of the specific pcell or specific pcell configuration in the IC designs 131(1)-131(x) of the CAD systems 100(1)-100(n).

Processing the CUI reports can further including analyzing the compiled CUI in the final report(s) (see process step 723). It should be understood that the analysis and subsequent actions taken during PDK revision development would vary depending upon the type of compiled CUI in the final report at issue.

For example, the compiled first type CUI in the final report 241, which includes a list of the different pcells and pcell configurations included in the IC designs of one or more CAD systems, can be analyzed or reviewed to identify critical targets (i.e., the particular pcells and the particular custom pcell configurations thereof) based on a set of critical target identification rules established by the PDK developer or development team (see process step 723a). For example, the rules can specify that the critical targets will include any listed pcell on the final report 241 and all possible pcell configurations for the listed pcells. Alternatively, the rules can specify that the critical targets will include only listed pcell configurations of listed pcells on the final report 241. Alternatively, the rules can define the critical targets in any other manner deemed suitable by the PDK developer or development team. In this case, the identified critical targets can be subjected to regression analyses (e.g., an old-versus-new layout regression check, a design rule check (DRC), and a layout-versus-schematic (LVS) check) and revising the PDK 110 can be performed (e.g., by a PDK developer or development team using text editing or other tools 260), based, in part, on the results of the regression analyses of the identified critical targets (as opposed to the results of the regression analyses of all pcells and pcell configurations) (see process step 730a).

It should be understood that the unique aspect of the disclosed PDK update or upgrade development method is not in the regression analyses themselves, but instead in analyzing the compiled CUI in the final report 241 in order to identify critical targets on which the regression analyses should be performed. As a result, processing time and costs associated with the regression analyses are significantly reduced. Even if randomly selected pcells and/or pcell configurations (i.e., pseudo CUI) have been inserted into the CAD-specific CUI reports and, thus, included in the final report 241 with compiled CUI, identified as critical targets, and subjected to regression analyses, the total number of pcells and pcell configurations thereof analyzed will still be significantly less than all configurations of all pcells.

The compiled second type CUI of the final report 242, which includes use statistics for all pcells and all pcell configurations (e.g., for one or more CAD systems of one or more customers), and, optionally, historical CUI reports of the same type could be employed to identify critical targets. This complied second type CUI could also be subjected to machine learning in order to predict user-demand for new pcell(s) and/or new pcell configuration(s) for previously available pcells based on the use statistic (see process step 723b). In this case, revising the PDK 110 can be performed (e.g., by a PDK developer or development team using text editing or other tools 260) based on the predicted user-demand (see process step 730b). For example, at process step 730b, new pcell(s) or new pcell configuration(s) can be added to the pcell library as a part of the PDK upgrade or update.

The compiled third type CUI of the final report 243, which includes use statistics for specific pcell(s) or specific pcell configuration(s) (e.g., which have been flagged as obsolete) can be analyzed to determine whether or not the specific pcell(s) or specific pcell configurations are completely out of use or, alternatively, whether or not the specific pcell(s) or specific pcell configurations meet some minimum use threshold requirement for retention. In this case, revising the PDK 110 can be performed (e.g., by a PDK developer or development team using text editing or other tools 260) based on either the complete absence of the specific pcell(s) or specific pcell configuration(s) from the final report 243 with compiled CUI or based on a failure to meet the minimum use threshold requirement for retention (see process step 723c). For example, at process step 723c, the specific pcell(s) or the specific pcell configuration(s) can be dropped from the pcell library in the PDK upgrade or update.

The method can further include storing the revised PDK 210 (e.g., on the storage medium 202(1)) and outputting the revised PDK 210 to the CAD system(s) (e.g., automatically or upon request following notification of revised PDK availability) (see process step 740). The revised PDK 210 can subsequently be stored on the storage medium 102(1) of the CAD system(s), replacing the PDK 110 in the case of an upgrade or modifying of the PDK in the case of an update, and can be employed during subsequent design of ICs.

By limiting the regression analyses performed during PDK update or upgrade development to identified critical targets (as opposed to all pcells and pcell configurations), the processing time and costs associated with the regression analyses are significantly reduced such that the overall turn around time and costs associated with revising the PDK are also significantly reduced. Furthermore, by enabling historical CUI and/or predicted user-demand to be considered when revising the PDK (e.g., when performing pcell regression analyses and when making library add/drop decisions), future customer-satisfaction with the IC design options available through and supported by the revised PDK 210 is ensured and the likelihood that ICs manufactured according to IC designs developed using the revised PDK 210 can be properly verified and validated is maximized, thereby maximizing product yield.

As mention above, an embodiment disclosed herein is a process design kit (PDK) product that includes a computer readable storage medium having a PDK (including data and script files) embodied therewith. Those skilled in the art will recognize that a "script" refers to a program or list of commands (i.e., instructions) that are stored in a file and executable by a computer or processor thereof to cause the computer or processor to perform a method. Thus, the PDK product is both a data and computer program product. Also disclosed herein are embodiments of another computer program product, which can be employed to implement the above-described systems and methods. Such a computer program product can similarly include a computer readable storage medium having program instructions embodied therewith. The program instructions can be executable by a computer or processor thereof to cause the computer or processor thereof to perform the above-described PDK update or upgrade development method.

More particularly, the disclosed embodiments of the present invention include systems, methods and one or more computer program products. Each computer program product may include a computer readable storage medium (or media) with computer readable program(s) or script(s) thereon, which such program(s) or script(s) include instructions (i.e., commands) for causing a computer or processor thereof to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (including scripts) described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program(s) or script(s) including the instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
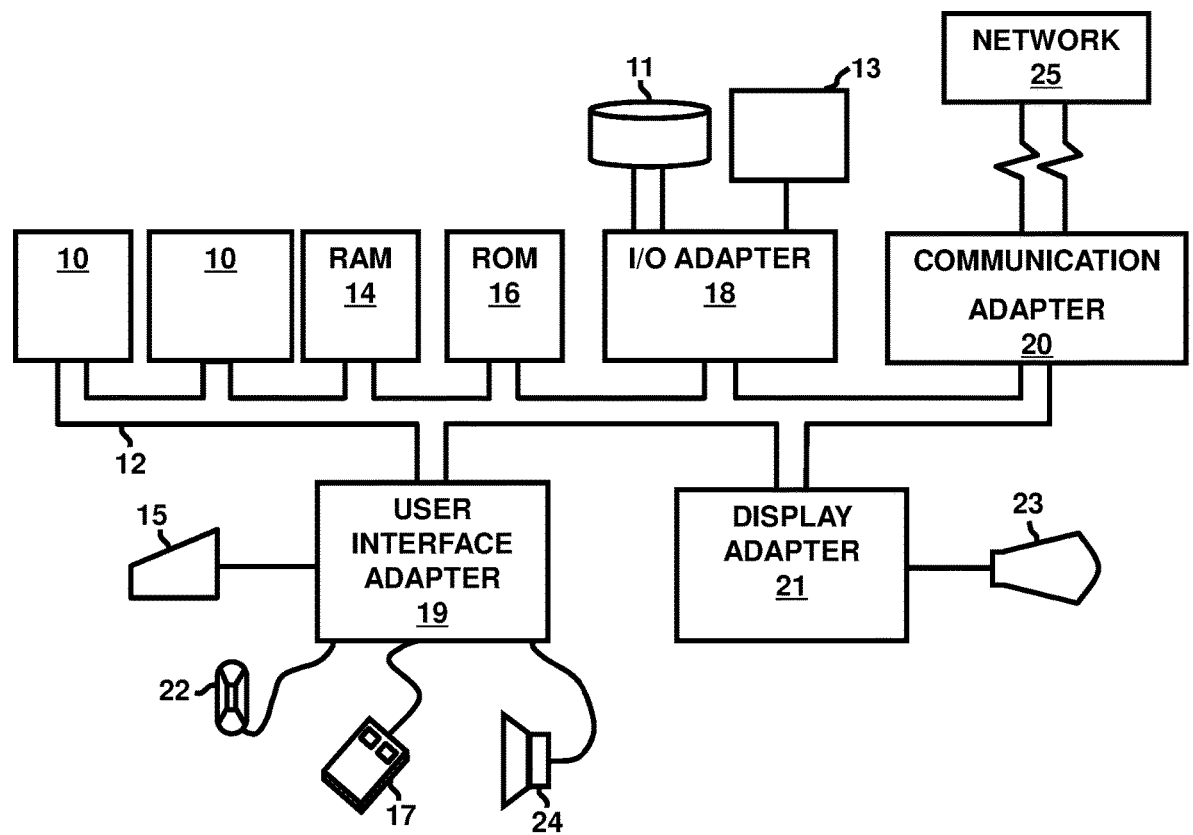
FIG. 8 is an exemplary hardware environment that can be incorporated into the above-described systems.

FIG. 8 depicts a representative hardware environment for implementing any of the system, method and computer program product embodiments disclosed above. Specifically, this schematic drawing illustrates a hardware configuration of an information handling/computer system. This computer system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11, other drives 13 or other program storage devices that are readable by the system. The system can read the inventive instructions of the program(s) or script(s) of the computer program product(s) stored on the computer readable storage medium and can follow the instructions to execute the methodology of the embodiments herein. The system further includes a user interface adapter 19 that connects a keyboard 15, mouse 17, speaker 24, microphone 22, and/or other user interface devices such as a touch pad, touch screen, etc. (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor; and
a non-transitory storage medium readable by the processor,
wherein the non-transitory storage medium stores a process design kit comprising a library of parameterized cells and a design scan script and further stores integrated circuit designs generated using the process design kit and comprising parameterized cells selected from the library and customized so as to have corresponding custom configurations,
wherein the design scan script is executable by the processor to cause the processor to run a scan of the integrated circuit designs in order to capture cell use information across all the integrated circuit designs, to generate one or more different cell use information reports based on the cell use information, and to output the one or more different cell use information reports, and
wherein the one or more different cell use reports comprise at least a first report indicating critical targets, each critical target being a particular parameterized cell with a particular custom configuration that requires a regression analysis when revising the process design kit.

2. The system of claim 1, wherein the execution of the design scan script by the processor is initiated on-demand.

3. The system of claim 1, further comprising a display, wherein each report is generated as a user-readable text file and wherein, before outputting each report, the processor displays the user-readable text file on the display and obtains user-authorization for the outputting of the report.

4. The system of claim 1, wherein, before outputting the first report, the processor further inserts pseudo cell use information into the first report.

5. The system of claim 1,
wherein the first report includes a first type of cell use information, and
wherein the first type of cell use information comprises: a list of all different parameterized cells within the integrated circuit designs and, for each listed parameterized cell, a single custom configuration when the integrated circuit designs comprise a single instance of the listed parameterized cell or all different custom configurations when the integrated circuit designs comprise multiple instances of the listed parameterized cell.

6. The system of claim 1,
wherein the one or more different types of cell use information reports further comprise a second report with a second type of cell use information,
wherein the second type of cell use information comprises:
a list of all parameterized cells;
for each parameterized cell, a total number of instances of the parameterized cell in the integrated circuit designs and all possible configurations for the parameterized cell; and
for each configuration of the parameterized cell, a total number of instances of that configuration, and
wherein the second report is employable during the revising of the process design kit to predict user-demand for any of a new parameterized cell and a new custom configuration for a previously available parameterized cell.

7. The system of claim 1,
wherein the one or more different types of cell use information reports further comprise a third report with a third type of cell use information,
wherein the third type of cell use information comprises, for at least one specific parameterized cell or at least one specific configuration of the at least one specific parameterized cell, a total number of instances in the integrated circuit designs, and
wherein the third report is employable during the revising of the process design kit to determine when to drop the at least one specific parameterized cell or the at least one specific configuration from the library.

8. A process design kit product comprising a non-transitory computer-readable storage medium, the non-transitory computer-readable storage medium having a process design kit embodied therewith, the process design kit comprising:
a library of parameterized cells; and
a design scan script, wherein the design scan script is executable by a processor to cause the processor to perform a method, the method comprising:
running a scan of integrated circuit designs that were generated and stored by a computer-aided design system using the process design kit, wherein each integrated circuit design comprises parameterized cells selected from the library and customized so as to have corresponding custom configurations and wherein the scan captures cell use information across all the integrated circuit designs;
generating one or more different types of cell use information reports based on the cell use information; and
outputting the one or more different types of cell use information reports,
wherein the one or more different cell use reports comprise at least a first report indicating critical targets, each critical target being a particular parameterized cell with a particular custom configuration that requires a regression analysis when revising of the process design kit.

9. The process design kit product of claim 8, wherein execution of the design scan script by the processor is initiated on-demand.

10. The process design kit product of claim 8, wherein each report is generated as a user-readable text file and wherein the method further comprises, before outputting each report, displaying the user-readable text file on a display and obtaining user-authorization for the outputting of the report.

11. The process design kit product of claim 8, wherein the method further comprises, before the outputting of the first report, inserting pseudo cell use information into the first report.

12. The process design kit product of claim 8,
wherein the first report comprises a first type of cell use information, and
wherein the first type of cell use information comprises:
a list of all different parameterized cells within the integrated circuit designs and, for each listed parameterized cell, a single custom configuration when the integrated circuit designs comprise a single instance of the listed parameterized cell or all different custom configurations when the integrated circuit designs comprise multiple instances of the listed parameterized cell.

13. The process design kit product of claim 8,
wherein the one or more different types of cell use information reports further comprise a second report with a second type of cell use information,
wherein the second type of cell use information comprises:
a list of all parameterized cells;
for each parameterized cell, a total number of instances of the parameterized cell in the integrated circuit designs and all possible configurations for the parameterized cell; and
for each configuration of the parameterized cell, a total number of instances of the configuration, and
wherein the second report is employable during the revising of the process design kit for predicting user-demand for any of a new parameterized cell and a new custom configuration for a previously available parameterized cell.

14. The process design kit product of claim 8,
wherein the one or more different types of cell use information reports further comprise a third report with a third type of cell use information,
wherein the third type of cell use information comprises, for at least one specific parameterized cell or at least one specific configuration of the at least one specific parameterized cell, a total number of instances in the integrated circuit designs, and
wherein the third report is employable during the revising of the process design kit for determining when to drop the at least one specific parameterized cell or the at least one specific configuration from the library.

15. A system comprising:
an input device receiving cell use information reports from one or more computer-aided design systems,
wherein each computer-aided design system has generated and stored integrated circuit designs using a process design kit,
wherein the process design kit comprises a library of parameterized cells and a design scan script,
wherein the integrated circuit designs comprise parameterized cells selected from the library and customized so as to have corresponding custom configurations,
wherein each computer-aided design system has executed the design scan script to run a scan of the integrated circuit designs in order to capture cell use information and to generate and output one or more different reports based on the cell use information,
wherein the one or more different reports comprise at least a first report with a first type of cell use information, and
wherein the first type of cell use information indicates critical targets, each critical target being a particular parameterized cell with a particular custom configuration that requires a regression analysis when revising the process design kit;
a processor; and
a non-transitory storage medium readable by the processor and storing the process design kit and the cell use information reports,
wherein the processor compiles the first type of cell use information from each first report to identify all of the critical targets requiring the regression analysis and causes regression analyses of identified critical targets to be performed during the revising of the process design kit.

16. The system of claim 15, wherein the revising of the process design kit comprises any of generating an update for the process design kit and generating an upgrade for the process design kit.

17. The system of claim 15, wherein each first report further comprises pseudo cell use information that is indistinguishable from the first type of cell use information.

18. The system of claim 15,
wherein the processor generates a final report of compiled first type cell use information,
wherein the compiled first type cell use information comprises:
a list of all different parameterized cells within all of the integrated circuit designs across all of the computer-aided design systems; and
for each listed parameterized cell, a single custom configuration when the integrated circuit designs comprise a single instance of the listed parameterized cell or all different custom configurations when the integrated circuit designs comprise multiple instances of the listed parameterized cell, and
wherein the revising of the process design kit is based, in part, on results of the regression analyses.

19. The system of claim 15,
wherein the one or more different reports further comprise a second report with a second type of cell use information,
wherein the processor compiles the second type of cell use information from each second report to generate a final report of compiled second type cell use information,
wherein the compiled second type cell use information comprises:
a list of all parameterized cells;
for each parameterized cell, a total number of instances of the parameterized cell in the integrated circuit designs across all of the computer-aided design systems and a list of all possible configurations for the parameterized cell; and
for each configuration for the parameterized cell, a total number of instances of that configuration,
wherein the processor analyzes the compiled second type cell use information to predict user-demand for any of a new parameterized cell and a new custom configuration for a previously available parameterized cell, and
wherein the revising of the process design kit is further based, in part, on predicted user-demand and comprises adding any of the new parameterized cell and the new custom configuration to the library.

20. The system of claim 15,
wherein the one or more different reports further comprise a third report with a third type of cell use information,
wherein the processor compiles the third type of cell use information from each third report to generate a final report of compiled third type cell use information,
wherein the compiled third type cell use information comprises, for at least one specific parameterized cell or at least one specific configuration of the at least one specific parameterized cell, a total number of instances in the integrated circuit designs across all computer-aided design systems,
wherein the processor further analyzes the compiled third type cell use information to determine whether the at least one specific parameterized cell or the at least one specific configuration meets a minimum use threshold requirement, and
wherein the revising of the process design kit comprises dropping the at least one specific parameterized cell or the at least one specific configuration from the library when the minimum use threshold requirement is not met.

* * * * *